United States Patent [19]

Jones, Jr.

[11] 4,404,609
[45] Sep. 13, 1983

[54] THIN FILM INDUCTIVE TRANSDUCER FOR PERPENDICULAR RECORDING

[75] Inventor: Robert E. Jones, Jr., San Jose, Calif.

[73] Assignee: International Business Machines Corporation, Armonk, N.Y.

[21] Appl. No.: 315,592

[22] Filed: Oct. 30, 1981

[51] Int. Cl.³ ............................ G11B 5/12; G11B 5/22
[52] U.S. Cl. ................................. 360/126; 360/102; 360/121; 360/123
[58] Field of Search ................ 360/126, 125, 119–123, 360/127, 110, 102–103

[56] References Cited

U.S. PATENT DOCUMENTS

| | | | |
|---|---|---|---|
| 4,052,749 | 10/1977 | Nomura et al. | 360/126 |
| 4,127,884 | 11/1978 | Nouchi et al. | 360/123 |
| 4,190,872 | 2/1980 | Jones, Jr. et al. | 360/125 |
| 4,191,983 | 3/1980 | Gibson | 360/126 |
| 4,219,855 | 8/1980 | Jones, Jr. | 360/125 |
| 4,241,367 | 12/1980 | Nomura et al. | 360/123 |
| 4,321,641 | 3/1982 | Lee | 360/103 |

OTHER PUBLICATIONS

IEEE Transactions on Magnetics, vol. MAG-16, #5, 9/80—"Self-Consistent Computer Calculations for Perpendicular Magnetic Recording".

*Primary Examiner*—Alfred H. Eddleman
*Attorney, Agent, or Firm*—Henry E. Otto, Jr.

[57] ABSTRACT

A thin film inductive transducer is shown comprising three magnetic layers (10, 11, 12) deposited on a slider substrate (13) for perpendicular recording of magnetic transitions on a movable magnetic medium. Two magnetic closures are provided. One is defined by electrical contact of one outer magnetic layer (12 or 10) with the intermediate magnetic layer (11 or 11') within the area bounded by conductive turns (a–h) of single layer coil (19 or 19'). The other is defined by electrical contact (10, 12 or 10', 12') outboard of the conductive turns (a–h). Magnetic transitions may be read by conventional peak detection techniques because the disclosed transducer has three pole tips (P1, P2, P3), the central one P2 of which is approximately 33–40% of the thickness of the outer pole tips (P1, P3). To avoid "wraparound", the pole tips (P1, P2, P3) are progressively narrower in width as their distance from the substrate (13) increases.

10 Claims, 5 Drawing Figures

THIN FILM INDUCTIVE TRANSDUCER FOR PERPENDICULAR RECORDING

BACKGROUND OF THE INVENTION

This invention relates to thin film inductive transducers, and more particularly to those suitable for perpendicular recording and reading of magnetic transitions on a moving magnetic recording medium.

Various configurations have heretofore been proposed to enhance efficiency of thin film inductive transducers during recording and to enhance the resolution of transitions during reading. Thin film inductive transducers suitable for conventional longitudinal recording consist of two magnetic layers providing a single gap head. A typical transducer of this type is disclosed in U.S. Pat. No. 4,190,872.

There has been increasing interest, however, in transducers suitable for perpendicular recording and reading because perpendicular recording has the potential of providing higher linear recording densities than are possible with conventional longitudinal recording.

In the IEEE *Transactions on Magnetics,* dated September 1980, at pp. 967 et seq., there is published a paper entitled "Self-Consistent Computer Calculations for Perpendicular Magnetic Recording" by R. I. Potter and I. A. Beardsley. In this paper analytical expressions are discussed for calculating magnetic fields for four types of recording heads considered for perpendicular recording: (a) ferrite head; (b) thin film head (of the single gap type); (c) double gap head (of the ferrite type); and (d) a single pole head and soft magnetic substrate. In this paper, a single gap thin film head is shown in FIG. 15; and FIG. 16 depicts a double gap head having a thin center pole tip but outer pole tips apparently of infinite width, which (like in FIG. 3 entitled "Ferrite Head") would be appropriate only for a double gap ferrite head. The location of the conductive turns and the overall configuration and method of fabrication of the head are not disclosed or suggested.

Thin film inductive transducers previously proposed for perpendicular recording and known to applicant are of the single gap type employing two magnetic layers. They undesirably produce a "dibit" pattern of magnetic transitions which is difficult to detect. Also, a phenomenon known as "wrap-around" described in U.S. Pat. No. 4,219,855 may occur with thin film heads. This phenomenon occurs due to misregistration of the magnetic layers at the pole tip during deposition. As a result, the edge portion of one layer overhangs at an angle the edge of the other layer, causing an undesirable reduction in the effective width of the said one layer and hence in efficiency of recording and reading.

No prior art known to applicant suggests a double gap thin film inductive transducer which is relatively easy to manufacture and which is especially suitable for high linear density perpendicular recording and reading. A thin film double gap head is preferable over a double gap ferrite head because the thin film head provides higher performance. It employs Permalloy magnetic material which provides higher frequency response than ferrite material; and since it is smaller, a thin film head has less inductance.

SUMMARY OF THE INVENTION

The main advantage of the invention as claimed is to provide a thin film inductive transducer in which the "dibit" type of magnetic transitions are replaced by data signals in the form of single voltage peaks of high amplitude. This desirably permits use of conventional peak detection techniques presently employed with longitudinal recording and reading arrangements associated with single gap thin film inductive transducers. A supplementary advantage of the invention as claimed is that applicant's improved configuration avoids the undesirable "wrap-around" phenomenon above described. Applicant's proposed structure provides a thin film three pole-tip probe head adapted for perpendicular recording with a minimum of additional layers beyond those required for a thin film two pole-tip probe head, thus facilitating manufacture. Applicant's three pole-tip probe head has approximately the same sensitivity as heretofore provided with the single gap two pole-tip heads employed for longitudinal recording.

According to the invention, a thin film inductive transducer especially suitable for perpendicular recording and reading of magnetic transitions on a movable magnetic recording medium is characterized by three thin film magnetic layers disposed in superposed spaced relation on a substrate to define a pair of magnetic transducing gaps at a pole tip region adjacent an air bearing surface. A single layer of conductive turns is disposed between the intermediate magnetic layer and one of the outer magnetic layers. There are two magnetic closures, one defined by electrical contact of said one outer layer with the intermediate layer within the area bounded by the conductive turns, and the other defined by electrical contact of said two outer layers outboard of the conductive turns.

BRIEF DESCRIPTION OF THE DRAWINGS

A thin film inductive transducer embodying the invention will now be described by way of example with reference to the accompanying drawings wherein.

DESCRIPTION OF PREFERRED EMBODIMENT

Figure 1:
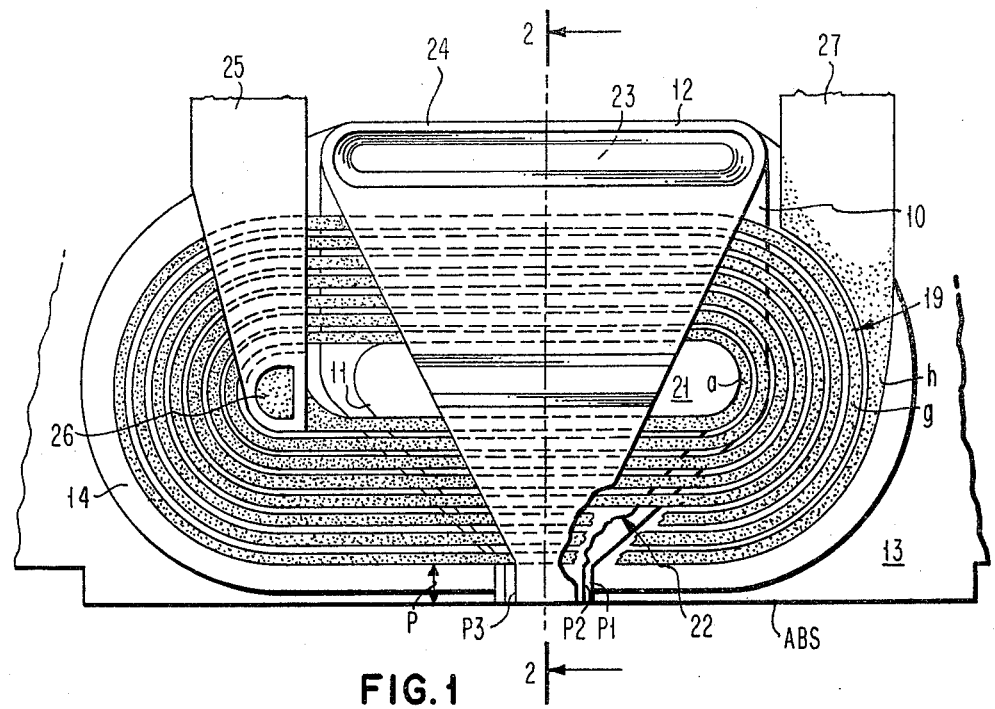
FIG. 1 is a front elevational view, partly broken away, of the transducer deposited on a substrate.
Figure 2:
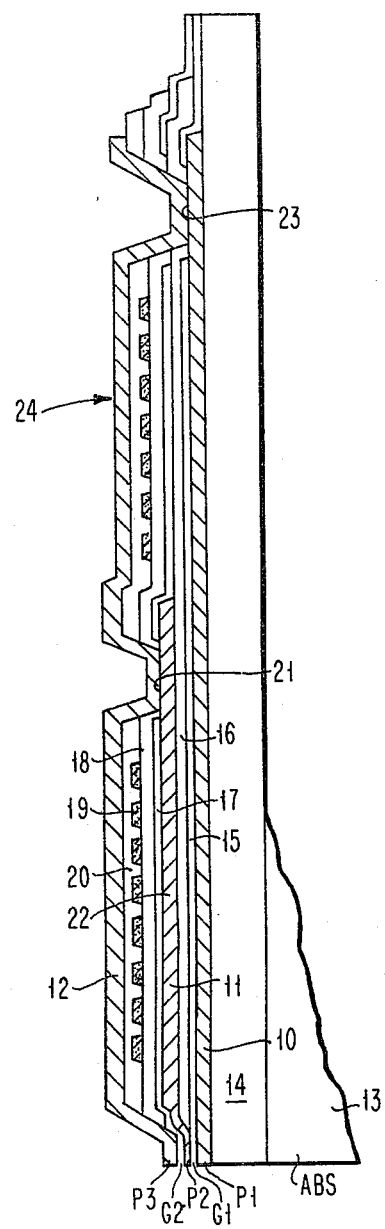
FIG. 2 is a sectional view to enlarged and laterally exaggerated scale, taken along the line 2—2 of FIF. 1.

As illustrated in FIGS. 1 and 2, the thin film inductive transducer embodying the invention comprises, briefly, three magnetic layers 10, 11, 12, preferably of Permalloy material, deposited as thin films in superposed, spaced relation on a substrate, such as a slider 13, having an air bearing surface (ABS).

More specifically, the layers 10-12 are deposited by conventional photolithography techniques in the following manner: A coating 14 of non-magnetic material, preferably $Al_2O_3$, is deposited on slider 13, then overcoated successively with magnetic layer 10, then another thin coating 15 of the same non-magnetic material, and a photo-resist insulating layer 16. On layer 16 is then deposited intermediate magnetic layer 11, followed by a thin overcoating 17 of the aforesaid non-magnetic material, and then a photo-resist insulating layer 18 on which is plated a flat conductor coil 19 consisting of a single layer of conductive turns a–h. Coil 19 is covered with a photo-resist insulating layer 20 over which is applied the third magnetic layer 12. It will be understood by those skilled in photolithography that by use of suitable masks and appropriate etching the configuration shown in FIGS. 1 and 2 can be readily achieved.

According to features of the invention, layers 10, 11, 12 are preferably of substantially equal thickness of the order of about 2.5–3 microns except at a pole tip region P. At region P the thickness of the intermediate layer 11 is substantially less, preferably of the order of about 1 micron. This provides a pair of equal magnetic transducing gaps G1, G2, preferably of the order of about 1 micron, at the region P. Intermediate layer 11 is maintained thick except in region P to enhance transducer efficiency. Pole tip region P extends preferably about 12 microns from the ABS.

Outer layer 12 extends toward and makes direct electrical contact with flat intermediate layer 11 in an area 21 encircled by the conductive turns a–h of coil 19 to form an elongated split ring 22. Ring 22 extends between said area and the ABS to constitute a first magnetic closure. Outer layer 12 also extends toward and makes direct electrical contact with flat outer layer 10 in an area 23 outboard of the turns a–h of coil 19 to form an elongated split ring 24. Ring 24 extends from area 23 to the ABS to constitute a second magnetic closure.

An overpass member 25, preferably of NiFe, makes electrical contact at 26 with a central portion of the coil 19; and the outermost turn h of the coil terminates in an enlarged area to constitute an electrical contact 27. Member 25 is connected to external circuitry (not shown) for processing data signals during recording and reading.

The magnetic layers 10, 11, 12 thus constitute respective magnetic poles having pole tips P1, P2, P3, respectively. The distance between each respective magnetic closure and the ABS is minimized by use of conductive turns a–h of equal thin width separated by a helical gap of constant minimal width, for maximizing efficiency during both recording and reading by minimizing flux leakage. The distance between the center line of one conductive turn to the adjacent conductive turn is preferably of the order of about 6–9 microns, with the width of the gap being about 2–3 microns.

As depicted in FIG. 1, the widths of the magnetic layers 10–12 at the pole tip region P are made progressively narrower as their distance from the slider 13 increases. This is to avoid the wrap-around problem earlier described. Thus, the pole tip P1 of magnetic layer 10 is wider than pole tip P2 of magnetic layer 11, which in turn is wider than pole tip P3 of magnetic layer 12; however, insofar as possible, the center lines of each pole tip P1, P2, P3 are aligned. The amplitude of the recording/reading threshold will depend upon the coercive force of the magnetic medium and the width of pole tip P2, under which the sharpest voltage peaks will occur. Thus the width P2 should be somewhat less than the width of each track on the magnetic medium (not shown) because the perpendicular field at threshold will generally be somewhat wider than P2.

The subject thin film transducer is relatively easy to manufacture. Although it has three poles 10, 11, 12 and has the potential for high linear density perpendicular magnetic recording, it requires only three layers (15, 16, 11) more than required for a thin film transducer of the two-pole type used for longitudinal recording. Note also that only a single conductor coil 19 is required.

Figure 3:
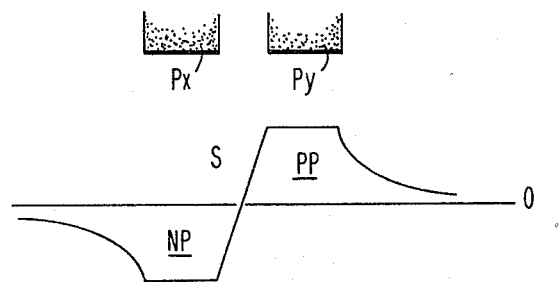
FIG. 3 is a circuit diagram denoting the approximate sensitivity function and "dibit" signal pattern during perpendicular magnetization using a prior art thin film two pole-tip head.

The primary advantage of the double gap thin film transducer herein disclosed is that it enables use of conventional peak detection techniques of the type used with longitudinal recording. This is best illustrated by reference to FIGS. 3 and 4. When a thin film single gap transducer having only two pole tips Px, Py is used in a perpendicular recording mode, the voltage signal S has a "dibit" configuration, as shown in FIG. 3. This signal S is difficult to detect, since the amplitude of the negative portion NP of the voltage signal is equal to that of the positive portion PP. Insofar as applicant is aware, efforts to sense this "dibit" form of signal have not proved satisfactory.

Figure 4:
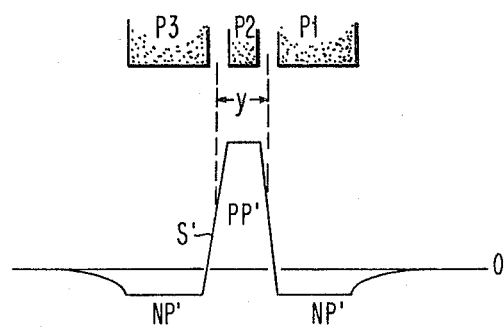
FIG. 4 is a circuit diagram denoting the approximate sensitivity function and single peak voltage signal during perpendicular magnetization using applicant's thin film three pole-tip probe head.

Noting the fundamental condition that the algebraic sum of the integrated areas under the negative and positive portions NP, PP of the signal curves always equals zero, applicant concluded that by use of a double gap thin film transducer configured as herein described, the signal could be reshaped as depicted by S' in FIG. 4. As a result, each isolated transition is sensed as a single narrow-width voltage peak pulse PP' of significant amplitude, with two shallow negative "wings" NP' similar to the output of the single gap two-pole thin film transducer used for longitudinal recording.

By use of the relatively thin central pole tip P2 and the relatively thick outer pole tips P1, P3, the configuration for reading is optimized.

The half-pulse width y (FIG. 4) should be approximately equal to the thickness of central pole tip P2 plus one-half the sum of the two equal gap dimensions G1, G2 (which will thus be 2.0 microns with the dimensions heretofore illustratively stated). With this half pulse width y equal to 2.0 microns and a velocity of the recording medium at its innermost track of 40 meters/second, the transducer would be approximately designed to operate at 20 MH2. It will be understood that the amplitude of the voltage pulse S' is a complicated function of the pole tip distance from the recording medium and the thickness of the medium; but, as a general rule, the amplitude will tend to increase as the central pole tip P2 becomes thinner until a point is reached at which the thinness of central pole tip P2 adversely affects the efficiency of the transducer and its ability to write.

In the embodiment just described, coil 19 is disposed between magnetic layer 11, 12 and the first magnetic closure is defined by electrical contact of layers 11, 12 at 21. The coil 19 is thus remote from slider 13.

Figure 5:
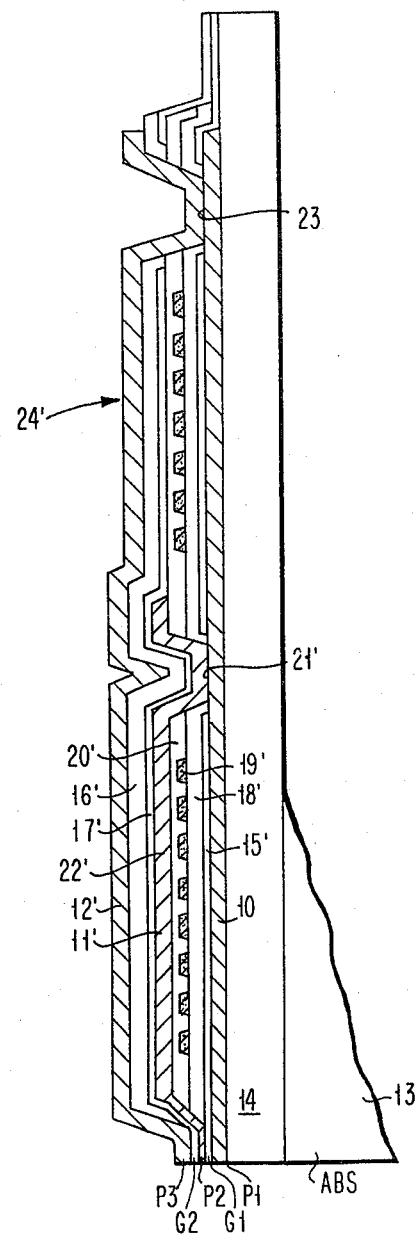
FIG. 5 is a view, generally like that of FIG. 2, denoting an alternative embodiment of the invention.

If preferred, however, the parts may be modified or rearranged as illustrated in FIG. 5, in which reference numerals identical with those in FIGS. 1 and 2 are used to denote identical parts and similar numerals except primed are used to denote the modified or rearranged parts. According to this alternative embodiment, coil 19' is disposed between magnetic layers 10, 11' an the first magnetic closure is defined by electrical contact of layer 11' with layer 10 at 21'. As a result, the coil 19' and first magnetic closure are now closer to slider 13.

While the invention has been shown and described with reference to a preferred embodiment thereof, it will be understood by those skilled in the art that the foregoing and other changes in form and detail may be made therein without departing from the spirit, scope and teaching of the invention. Accordingly, the transducer herein disclosed is to be considered merely as illustrative and the invention is to be limited only as specified in the claims.

I claim:

1. A thin film inductive transducer, provided on a substrate having an air bearing surface, for perpendicular recording and reading of magnetic transitions on a movable magnetic recording medium, characterized by:

three thin film magnetic layers disposed in superposed spaced relation on the substrate, with the second layer intermediate the first and third layers, to define a pair of magnetic transducing gaps in a pole tip region adjacent the air bearing surface;

at least one single layer of conductive turns disposed between said first layer and second layer;

said first layer contacting said second layer in an area encircled by the conductive turns for forming a split ring enclosing the portion of said conductive turns between said area and the pole tip region to constitute a first magnetic closure; and said first layer contacting said third layer outboard of the conductive turns for forming another split ring to constitute a second magnetic closure; thereby to provide pulses capable of being sensed by peak detection techniques.

2. A transducer according to claim 1, further characterized by the thickness of the second layer in the pole tip region being less than half of that of the first and third layers.

3. A transducer according to claim 1, further characterized by the thickness of all three magnetic layers being substantially equal, except in the pole tip region, where the second magnetic layer is of the order of about 33–40% of that of the first and third layers.

4. A transducer according to claim 1, characterized by the widths of the magnetic layers at the pole tip region being progressively narrower as their distance from the substrate increases.

5. A transducer according to claim 1, further characterized in that, in the pole tip region, the second layer has a thickness of the order of about 1 micron and the first layer and third layer have thicknesses of the order of about 2.5–3 microns, whereas remote from the pole tip region the three magnetic layers are of substantially equal thickness of the order of about 2.5–3 microns, and the dimension of each transducing gap is of the order of about 0.5 micron.

6. A transducer according to claim 1, characterized by said first layer being farthest from the substrate.

7. A transducer according to claim 1, characterized by said first layer being the closest to the substrate.

8. A transducer according to claim 1, characterized by the distance between each magnetic closure and the air bearing surface being minimized by use of conductive turns of equal thin width separated by a helical gap of constant minimal width, for maximizing efficiency during both recording and reading by minimizing flux leakage.

9. A transducer according to claim 1, characterized by a member contacting said area for processing magnetic transitions constituting data signals during recording and reading, said signals being in the form of single pulses of high amplitude and a half-width approximately equal to the thickness of the second layer in the pole tip region plus one-half the sum of the dimensions of each of the transducing gaps.

10. A transducer according to claim 1, characterized in that the perpendicular field is sharpest under the pole tip of said second layer and slightly wider than the width of said pole tip of said second layer.

* * * * *